US006494153B1

United States Patent
Lyon

(10) Patent No.: US 6,494,153 B1
(45) Date of Patent: Dec. 17, 2002

(54) UNMIXED COMBUSTION OF COAL WITH SULFUR RECYCLE

(75) Inventor: Richard K. Lyon, Pittstown, NJ (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/917,799

(22) Filed: Jul. 31, 2001

(51) Int. Cl.[7] ............................. F23J 15/00; F23B 7/00; F02B 43/00
(52) U.S. Cl. .................. 110/345; 110/347; 110/245; 110/233; 60/39.12
(58) Field of Search ............................ 423/230, 231, 423/244.01, 244.06, 244.1, 246, 247, 573.1, 576.8; 110/342, 344, 345, 243, 244, 245, 347, 233; 60/649, 39.12, 39.464

(56) References Cited

U.S. PATENT DOCUMENTS

| | | | |
|---|---|---|---|
| 3,807,090 A | * 4/1974 | Moss | 48/128 |
| 3,977,844 A | * 8/1976 | Van slyke | 48/202 |
| 3,987,146 A | * 10/1976 | Clay et al. | 423/239 |
| 4,255,162 A | * 3/1981 | Moss | 48/197 R |
| 4,806,158 A | * 2/1989 | Hirsch | 75/26 |
| 4,884,396 A | * 12/1989 | Miyomoto et al. | 60/39.12 |
| 5,244,641 A | * 9/1993 | Khare | 423/220 |
| 5,339,754 A | 8/1994 | Lyon | |
| 5,469,698 A | * 11/1995 | Garcia-Mallo | 60/39.02 |
| 5,509,362 A | 4/1996 | Lyon | |
| 5,827,496 A | 10/1998 | Lyon | |
| 5,853,684 A | * 12/1998 | Fnag et al. | 423/244.1 |
| 5,914,288 A | * 6/1999 | Turk et al. | 502/38 |
| 6,032,467 A | * 3/2000 | Oshita et al. | 60/651 |
| 6,090,356 A | * 7/2000 | Janhnke et al. | 423/210 |
| 6,306,793 B1 | * 10/2001 | Turk et al. | 502/216 |
| 2002/0059864 A1 | * 5/2002 | Janssen et al. | 95/108 |

* cited by examiner

Primary Examiner—Ira S. Lazarus
Assistant Examiner—K. B. Rinehart
(74) Attorney, Agent, or Firm—Nixon & Vanderhye P.C.

(57) ABSTRACT

An improved method of burning low sulfur coal in order to power gas turbines using unmixed combustion that ensures virtually complete oxidation of the coal, with the sulfur content of the coal being recovered as elemental sulfur for use as recycle in the unmixed combustion process. An unmixed combustion catalyst is circulated between two fluid bed reactors and becomes reduced by low sulfur coal in the first fluid bed reactor and oxidized by air in the second fluid bed reactor. The first reactor produces carbon-containing fly ash which is then separated and contacted with gases containing $SO_2$ from the first fluid bed reactor to produce $CO_2$, CO, $H_2S$, COS, $CS_2$, and elemental sulfur. The elemental sulfur is separated and a portion thereof recycled back to the first fluid bed reactor.

14 Claims, 2 Drawing Sheets

UNMIXED COMBUSTION OF COAL WITH SULFUR RECYCLE

BACKGROUND OF THE INVENTION

This invention relates to an improved method of burning coal in order to power gas turbines by providing virtually complete oxidation of the coal using unmixed combustion, but without the adverse environmental consequences associated with conventional coal-fired systems.

The types of air pollution produced by coal combustion are well known and include particulate emissions such as fine particles of ash from pulverized coal firing, the oxides of sulfur, $SO_2$ and $SO_3$, carbon monoxide emissions, and the emission of two of the oxides of nitrogen, NO and $NO_2$. More recently, the problem of global warming due to Greenhouse gas emissions has been recognized, and the emissions of $CO_2$ from power plants and other combustion systems have become a matter of serious environmental concern.

The problem of global warming due to $CO_2$ emissions from coal and other fossil fuel combustion processes involves two basic issues. First, because of the significant amount of carbon dioxide released by conventional coal-fired systems, a need exists to modify the processes so that the $CO_2$ leaves the process in a form that allows it to be readily disposed, i.e., producing "sequestration ready" $CO_2$ that can be isolated and disposed of without release into the atmosphere. Second, the need exists to find improved methods for disposing of $CO_2$ and other waste gases that are technically feasible and economically viable. Since many proposed disposal options all involve liquid $CO_2$ (such as pumping liquid $CO_2$ into deep parts of the ocean), it is generally accepted that for the $CO_2$ to be "sequestration ready," it need not be free of all impurities, but must not contain more than small amounts of other gas components that do not liquefy under pressure at ambient temperature.

In addition to known air pollution/$CO_2$ emission problems, the combustion of coal has certain disadvantages relative to other fuels in powering gas turbine engines. Gas turbines are the lowest capital cost systems available for generating electrical power on a large scale. However, the thermodynamic efficiency of gas turbines normally is lower than other higher capital cost systems. As a general proposition, the thermodynamic efficiency improves by increasing the inlet temperature of the gas working fluid. Thus, recent efforts to maximize turbine efficiency have focussed on increasing the turbine inlet temperature. As a result, turbine blades and other key components of gas turbines exposed to the working fluid have been engineered to tolerate higher first stage inlet gas temperatures.

Despite the possibility for increased operating temperatures in gas turbines, a known disadvantage of coal-fired systems concerns the composition of hot gases produced by coal oxidation. The exhaust gases from coal contain fly ash that can be erosive to and corrosive to most metals used for conventional gas turbine blades. Consequently, the maximum turbine inlet temperature for coal firing typically is lower than that for a "clean" fuel. Although improvements in gas turbine design and metallurgy have resulted in higher inlet gas temperatures for coal-fired systems, the maximum temperatures for clean fuels also increased. Thus, the efficiency disadvantage of coal relative to clean fuels remained. Over the years, this disadvantage has prevented the lower cost of coal from being considered as the principal gas turbine fuel in this country. Thus, if a process were developed whereby coal could be burned in a manner that produced hot gases that were not erosive or corrosive, particularly at higher inlet temperatures, coal could become a much more attractive gas turbine fuel.

With respect to global warming, coal has the further disadvantage that its $CO_2$ emissions per BTU produced are significantly higher than those of "cleaner" fossil fuels. Again, if the means existed whereby coal could be burned in a manner that did not result in the emission of large amounts of $CO_2$ and/or other pollutants, this disadvantage would disappear.

U.S. Pat. Nos. 5,339,754 and 5,509,362; and 5,827,496 (incorporated herein by reference) disclose a new method of burning solid fuels such as coal known as "unmixed combustion" which involves the use of a catalyst that is readily reduced when in an oxidized state and readily oxidized when in a reduced state. In essence, fuel and air are alternatively contacted with the catalyst. The fuel reduces the catalyst and is oxidized to $CO_2$ and water vapor. The air in turn oxidizes the catalyst and becomes depleted of oxygen. Thus, combustion can be effected without the need of mixing the fuel and air prior to or during the combustion process. If means are provided whereby the $CO_2$ and water vapor and the oxygen depleted air can be directed in different directions as they leave the combustion process, then mixing can be completely avoided.

The total volume of combustion gases produced by unmixed combustion is comparable to that produced in conventional combustion. However, the volume of the $CO_2$+ water vapor steam represents only small part of the total. Those skilled in the art recognize that the cost of removing acid gases such as $SO_2$, HCl and HF from combustion effluents by scrubbing increases with the volume of gas being scrubbed. Thus, if unmixed combustion can be done in such a manner that the acid gases leave the combustion process in the $CO_2$+water vapor steam, the volume of gas which must be scrubbed is greatly reduced. Likewise, the cost of scrubbing becomes significantly lower.

The '362 patent notes that operating unmixed combustion in a manner such that the acid gases leave the combustor in the $CO_2$+water vapor steam requires an appropriate choice of catalyst. The patent is discussed in greater detail in Paper 98F-36, presented at the October 1998 meeting of the Western States Section of the Combustion Institute. The authors of the paper (hereafter referred to as the "Combustion Institute paper") include R. K. Lyon, a named inventor of the '362 patent, and J. A. Cole. The present invention involves an improvement to the basic combustion process described in the patent and 1998 paper.

The Combustion Institute paper discloses a conceptual process for using coal to power a gas turbine and reports on a series of experiments illustrating certain specific aspects of the process. One such experiment uses a fluid bed of powdered chemically pure iron oxide (i.e., $FeO/Fe_2O_3$) operated at atmospheric pressure in which the gas used to fluidize the bed is switched from air to a mixture of 5% $SO_2$+95% $N_2$ and back again.

Various two-step experiments were done with this setup. In the first step, a bed fully oxidized to $Fe_2O_3$ was fluidized with the 5% $SO_2$+95% $N_2$ at a temperature of 857° C. A small amount of Illinois coal was then injected into the bed while the gases coming out of the bed were continuously analyzed. In the second step, the fluidizing gas was switched to air while the gases coming out of the bed were continuously analyzed. Based on this data, the Combustion Institute paper concludes that in the presence of $SO_2$ coal is readily oxidized and that the chief carbon-containing product of this oxidation is $CO_2$ with little or no CO being produced.

The paper attributes the ability of the solid particles of $Fe_2O_3$ to rapidly oxidize the solid particles of coal to a catalytic action by the $SO_2$ used in the fluidizing gas. In this catalytic process, the $SO_2$ reacts with the coal, converting it into to $CO_2$, CO, $CS_2$, COS, and sulfur vapor. The CO, $CS_2$, COS and sulfur vapor are oxidized by the Fe to $CO_2$ and $SO_2$. The gases exiting the bed when fluidized with air contained little or no $SO_2$ and little or no CO and $CO_2$. From this, the Combustion Institute paper concludes that the $Fe_2O_3$ oxidized the coal to completion during the first step, i.e., while the bed was fluidized with 5% $SO_2$+95% $N_2$. The oxidation converted all the sulfur in the coal to $SO_2$ and other volatile species which exited the bed during the first step of the experiment.

Another series of two-step experiments involved fluidizing the bed with $N_2$ and injecting thiophene ($C_4H_4S$). Like the experiments with coal, when the amount of thiophene injected was small, all of the sulfur exited the bed as $SO_2$ and other volatile species during the first step. Increasing the amount of injected thiophene, however, changed this situation. That is, injecting thiophene in excess of a specific threshold amount caused some of the sulfur to be retained in the bed during the first step and to be released as $SO_2$ during the second air fluidization step.

The Combustion Institute paper speculates that the observed threshold is a result of FeS being formed, i.e., after thiophene reduces some of the $Fe_2O_3$ to FeO, the injection of additional thiophene causes the formation of FeS. Once formed, the FeS remains during the first step and then oxidizes to $Fe_2O_3$ and $SO_2$ during the air fluidization step.

Given these observations, the Combustion Institute paper proposes a conceptual design for a process to use coal to power a gas turbine. As shown in the reference's Figure 4, the $Fe_2O_3$ catalyst is used as a fluidized powder, circulating between a first fluid bed which is fluidized with steam and a second fluid bed which is fluidized with air. Figure 4 shows the transfer lines between these fluid bed as being purged with steam. The second fluid bed is fluidized with compressed air from the compressor section of a gas turbine. Within this second bed, FeO is oxidized to $Fe_2O_3$, a strongly exothermic reaction that depletes the compressed air of oxygen and heats the air. This heated compressed air is then used to drive the expander section of the gas turbine.

The Combustion Institute paper also contemplates feeding pulverized coal to the first steam fluidized bed where it reduces the $Fe_2O_3$ to FeO while being oxidized to $CO_2$, water vapor, and fly ash. All the volatile products of combustion are swept from the fluidized bed, with the fluidization conditions being adjusted such that the fly ash can be rapidly removed by elutriation. Figure 4 calls for the fly ash to be removed from the other combustion products with a cyclone separator after which the ash goes to disposal. After heat is recovered from the remaining combustion products, water vapor is removed by condensation and the resultant $CO_2$ and $SO_2$ mixture are disposed of.

The Combustion Institute paper notes that the conditions under which the coal is oxidized are such that all or virtually all of the sulfur in the coal is converted to $SO_2$ and other volatile species rather than reacting with the $FeO/Fe_2O_3$ to form FeS or other nonvolatile sulfur containing species. The formation of FeS and similar species is undesirable since, instead of being swept out of the steam fluidized bed, they would circulate to the air fluidized bed where they oxidize to $SO_2$.

Although instructive, the process described in the Combustion Institute paper has at least three limitations. The first relates to $SO_2$ emissions; a second concerns the efficiency with which the coal is burned; and a third involves the efficiency with which the gas turbine produces power from the heat liberated by burning the coal.

As discussed above, the paper discloses the significance of a specific threshold amount of thiophene. If the conversion of the $Fe_2O_3$ to FeO is kept below this threshold, FeS is not formed and $SO_2$ emissions are avoided. Although the paper discloses an amount of thiophene which is one experiment exceeded this threshold, it is silent as to how one skilled in the art would use $Fe_2O_3$ was used in this experiment. Thus, while the paper reports the existence of a threshold amount of thiophene, it is silent with respect to the extent of $Fe_2O_3$ conversion at which the threshold occurs. In addition, the paper does not discuss how changing the temperature might affect the threshold amount. Nor does it teach how the threshold is affected by changes in form of the $Fe_2O_3$, for example in "red mud," the byproduct of aluminum production having a high iron content. The lack of discussion on these subjects reflects an unsolved problem in using unmixed combustion.

The Combustion Institute paper notes that the 5% $SO_2$ corresponds to the amount of $SO_2$ produced by oxidation of high sulfur Illinois coal with $Fe_2O_3$ at elevated pressure. For lower sulfur coals, the concentration of $SO_2$ is lower, making the coal's oxidation rate unacceptably low. The only solution suggested to solve this problem is very expensive. The paper recommends raising the $SO_2$ concentration by recycling $SO_2$, i.e., by recovering $SO_2$ from the recovered $SO_2$+$CO_2$ mixture and returning it to the first fluid bed.

However, if coal is to be used to power a gas turbine in an efficient manner, obviously it is essential that the coal be burned efficiently, i.e., virtually complete combustion is necessary. This requires that the rate of coal oxidation in the first fluid bed be high. Other than this expensive solution, the Combustion Institute paper is silent with respect to means for maintaining a high oxidation rate in the first fluid bed.

Efficient coal combustion also requires that the carbon content of the fly ash be low. The experiments described in the Combustion Institute paper show that coal can be rapidly oxidized to $CO_2$, water vapor and fly ash. However, a coal particle becomes "fly ash" when oxidation shrinks the particle to the point that it flies out of the fluid bed. While this implies that the fly ash would have a substantial carbon content, the paper does not identify any specific carbon content. Figure 4 shows removing fly ash from the gases leaving the first fluid bed using a cyclone separator and sending the fly ash to disposal. This, however, would mean discarding a significant fraction of the coal's valuable heat of combustion.

It is well known that the theoretical maximum efficiency of a gas turbine increases with increasing turbine inlet temperature. Thus, if a gas turbine is to operate with an acceptably high efficiency, the inlet temperature must be correspondingly high, i.e., at temperatures approaching 1500° C. For the process shown in Figure 4, the turbine inlet temperature would be the same or slightly less than the temperature at which the second fluid bed operates. On page 10, the Combustion Institute paper teaches that the first fluid bed should be operated at a temperature of 700–900° C. and that the second fluid bed should be operated at "nearly 1500° C. In order to provide this temperature, the ratio of coal feed to the first bed must be sufficient so that 60% of the Fe is reduced to FeO.

These teachings represent a compromise between the conflicting need to maximize turbine efficiency and avoid $SO_2$ emissions. The paper teaches that to improve turbine efficiency, an inlet temperature greater than 1500° C. will be necessary and that whenever the threshold for FeS formation is less than 60% conversion of the $Fe_2O_3$, some of the sulfur in the fuel will be emitted to the atmosphere as a pollutant. The sulfur in the coal is then recovered as $SO_2$. However, as noted above, there is virtually no market for sulfur in the form of $SO_2$ and its storage and disposal can be expensive and difficult. Elemental sulfur, on the other hand, can be readily shipped and has a substantial market. If the sulfur cannot be sold, its storage and/or disposal are relatively easy and inexpensive.

Thus, a need still exists in the art for a new method of burning coal to power gas turbines using unmixed combustion that avoids the limitations of the prior art processes discussed above.

SUMMARY OF THE INVENTION

The present invention provides an improved method of burning coal to power gas turbines using unmixed combustion but with virtually complete oxidation of the coal. The invention also permits the use of low sulfur coals, with the sulfur content of the coal being recovered as elemental sulfur, a portion of which can be recycled to the process and the remainder recovered for commercial use or disposal.

In one exemplary embodiment, the carbon-containing fly leaving the first fluidized bed reactor is sent to a second fluidized bed reactor where the ash contacts $SO_2$ and reacts to form gaseous products, thus producing an ash of low carbon content suitable for disposal. In another embodiment, carbon-containing fly ash from the first fluid bed is not sent to a cyclone separator (as taught by the Combustion Institute paper) but rather to a high temperature filter. While the gases leaving the first fluid bed pass through the filter, the solid particles of carbon-containing ash remain in the bed for an extended time before being removed. The gases coming out of the first fluid bed contain $SO_2$ which react with the carbon in the fly ash. The carbon in the fly ash consists of a char and thus contains at least some hydrogen. By means specified herein, the amount of $SO_2$ present in these gases is adjusted to provide one mole of $SO_2$ for every mole of carbon in the fly ash and one mole of $SO_2$ for every four moles of hydrogen. Significantly, the products of the reaction are a mixture of $CO_2$, CO, $H_2S$, COS, $CS_2$, and elemental sulfur. For this particular product mixture, the amount of $SO_2$ is a stoichiometric excess. This excess of $SO_2$ allows the carbon in the fly ash to be almost completely gasified. The gaseous reaction mixture leaving the filter thus contains elemental sulfur in addition to $CO_2$.

Catalysts for carrying out the preferred reaction are known in the art. The gaseous reaction mixture is passed through the catalysts and the elemental sulfur is recovered. An amount of elemental sulfur sufficient to provide one mole of $SO_2$ for every mole of carbon in the fly ash and one mole of $SO_2$ for every four moles of hydrogen is then recycled back to the first fluid bed. The balance of elemental sulfur is recovered for sale or disposal.

In still another embodiment of the invention, the complete removal of the carbon from the fly ash is not required when forms other than elemental sulfur are acceptable. The amount of elemental sulfur recycled to the fluid bed can be adjusted accordingly.

DETAILED DESCRIPTION OF THE INVENTION

In its broader aspects, the invention covers a process for burning coal containing fuels using an unmixed combustion catalyst capable of being reduced when in an oxidized state and oxidized when in a reduced state. The preferred embodiment includes the steps of circulating the unmixed combustion catalyst between two fluid bed reactors whereby the catalyst is reduced by coal in the first fluid bed reactor and oxidized by air in the second fluid bed reactor and produces carbon-containing fly ash and gases containing $SO_2$ in the first fluid bed reactor. The carbon-containing fly ash produced in the first fluid bed reactor is then separated and contacted with gases containing $SO_2$ from the first fluid bed reactor to produce $CO_2$, CO, $H_2S$, COS, $CS_2$, and elemental sulfur. The elemental sulfur is then separated from the other gases and a portion thereof recycled back to the first fluid bed reactor.

It has now been found that the use of a sulfur recycle in accordance with the invention ensures virtually complete oxidation of low sulfur coals using unmixed combustion according, with the sulfur content being recovered as elemental sulfur. The portion of sulfur being recycled to the first fluid bed rector should be in an amount slightly greater than the stoichiometric amount necessary to oxidize the carbon in the fly ash produced in the first fluid bed reactor.

Figure 1:
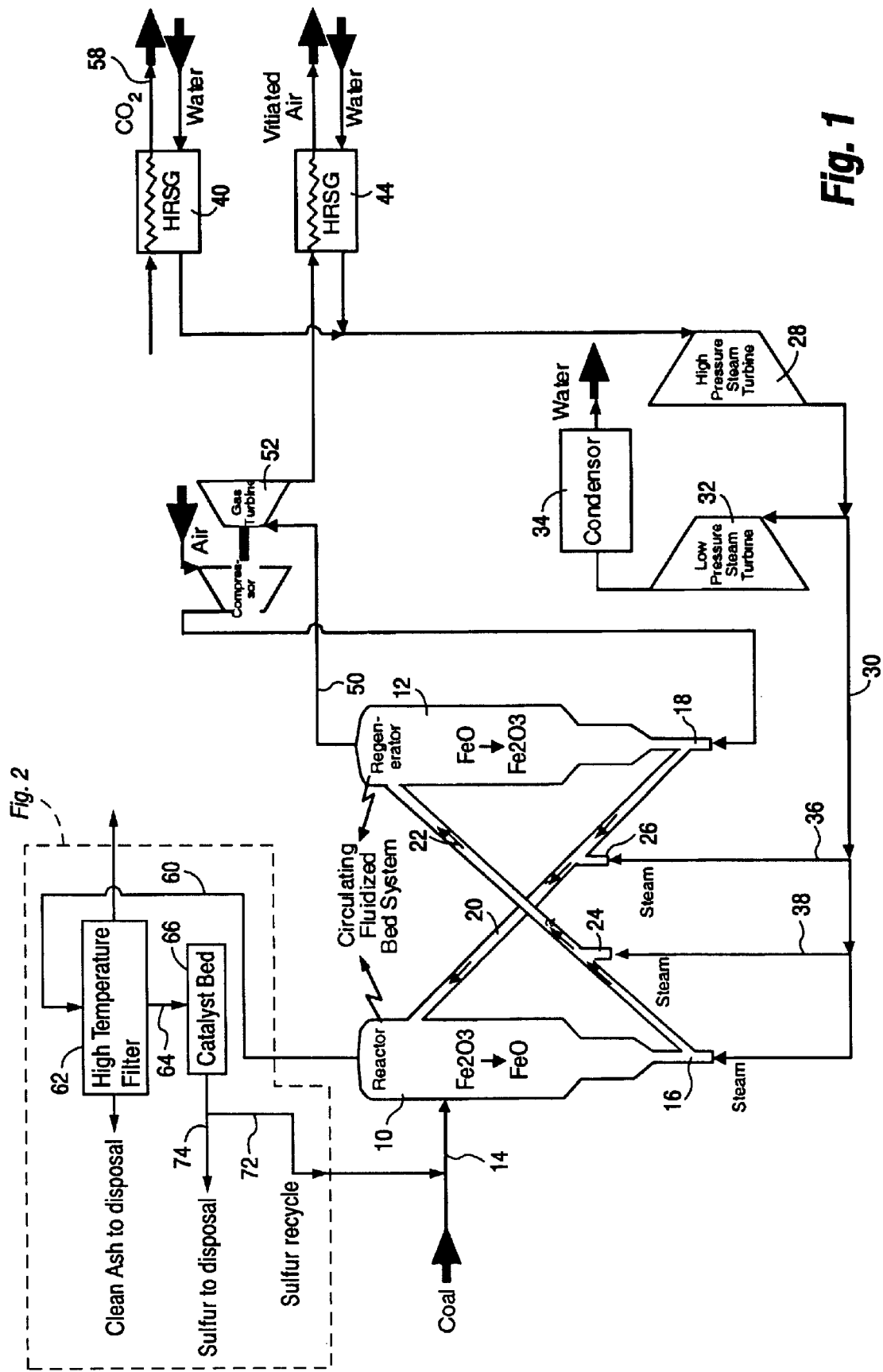
FIG. 1 is a schematic diagram of a circulating fluidized bed system in accordance with the preferred embodiment of the invention.

With specific reference to FIG. 1, a mixture of coal and steam is fed to a first fluidized bed reactor 10 and air is fed to a second fluidized bed reactor 12 (labeled "Regenerator"). Coal is supplied to the first reactor 10 via inlet 14 (which can be an airlock type inlet) at about the midpoint of fluidized bed 10, while steam is supplied to the bottom of the reactor via inlet 16. Air is supplied to the bottom of the second reactor 12 via inlet 18. A catalyst containing iron oxides (FeO and $Fe_2O_3$) is circulated between the two fluidized beds 10, 12 via crossover conduits 20, 22 in order to transfer oxygen present in the system. The connections between the fluidized beds are isolated by flowing steam via inlets 24, 26 to prevent the crossover of gases.

Steam for the first fluidized bed reactor 10 is primarily supplied by a high pressure steam turbine 28 via stream 30. Some the steam is supplied to a low pressure steam turbine 32 and then to condenser 34. A portion of the steam is also extracted for supply to the crossover conduits 20, 22 via respective streams 36, 38. In the first fluidized bed 10, the $Fe_2O_3$ is reduced to FeO.

As the coal particles react, they become smaller and are carried to the top of the fluidized bed in reactor 10. Meanwhile, fresh $Fe_2O_3$ is introduced at the top of the fluidized bed 10 and circulates throughout the bed as it is converted to FeO. At the bottom of the first fluidized bed, the FeO is conveyed through a vapor lock and conduit 22 to the top of the second fluidized bed 12. Gas stream 60 leaving the first fluidized bed reactor 10 (which contains fly ash and waste gases such as $SO_2$) is then fed through a high temperature filter 62 and catalyst bed 66 as depicted in greater detail in FIG. 2 in order to recover a portion of the sulfur for recycle to reactor 10 via inlet 14.

The second fluidized bed 12 in FIG. 1 is fluidized with air which oxidizes the FeO to $Fe_2O_2$ Clean fuel such as natural gas can, depending on operating conditions, be added to the air via line 70. The oxidation of this clean fuel in fluidized bed 12 provides additional heat. The gas stream 50 leaving the second fluidized bed 12 typically passes through a cyclone or other hot gas cleanup system (not shown) to remove elutriated metal oxides. The product gas from the second fluidized bed consists of vitiated air, which is then expanded across gas turbine 52. The second fluidized bed may consist of a bubbling fluidized bed or a riser reactor. The remaining enthalpy in the different streams outlined in FIG. 1 can be recovered in HRSG units, thereby providing steam for fluidization, steam for purging the vapor locks and steam for generation of electricity in steam turbines.

Figure 2:
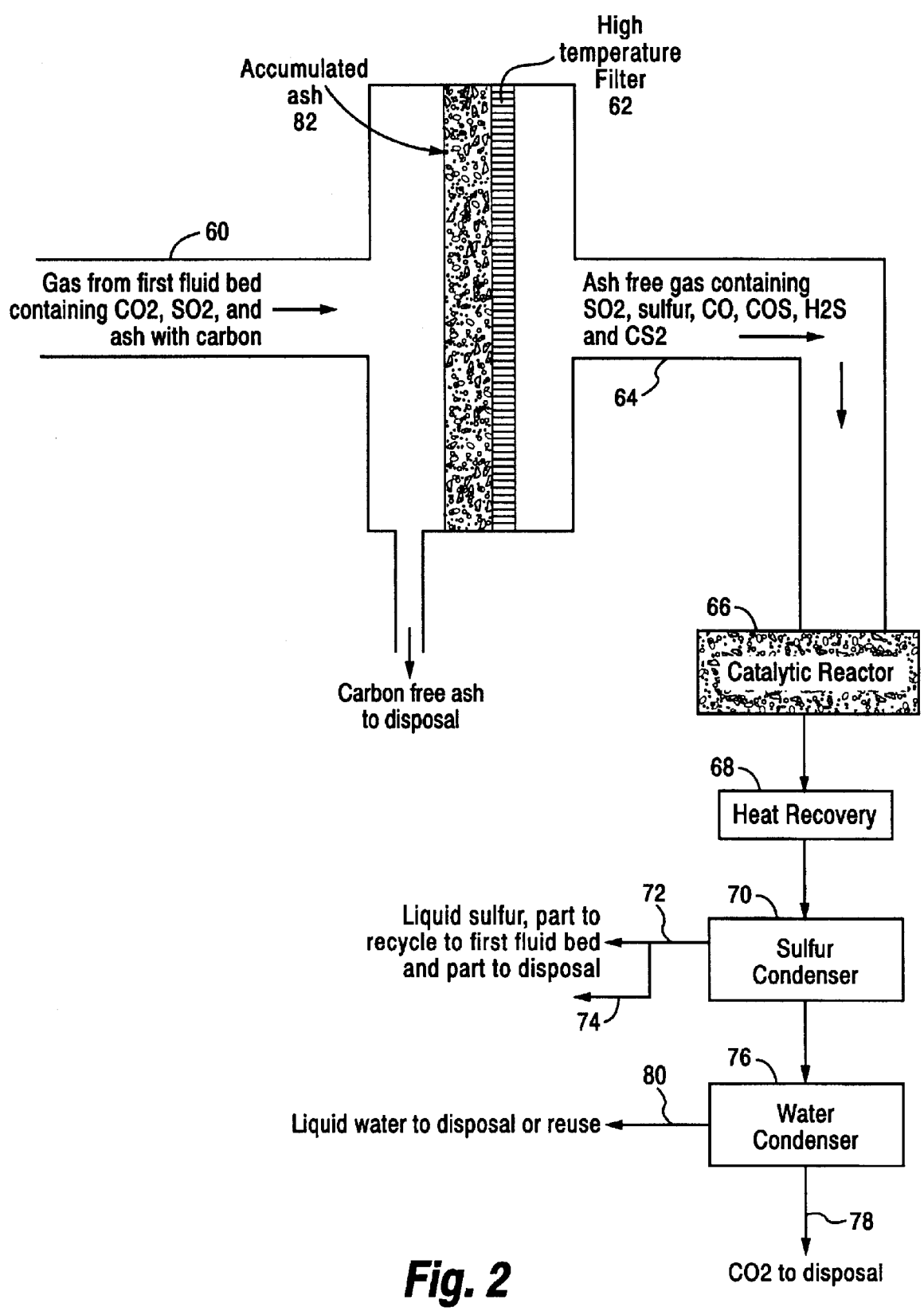
FIG. 2 is an exploded and more detailed view of the sulfur recycle and recovery subsystem used with the process depicted in FIG. 1.

FIG. 2 depicts an exploded view of the sulfur recycle feature in accordance with the present invention. The fly ash and gases coming out of the first fluid bed reactor 60 first go to a high temperature filter 62 which removes and accumulates the ash material in the filter. The design and operation of such filters are well known in the art. At various intervals, a mechanism on the filter cleans the accumulated ash 82 from the filter core and sends it to disposal. During the time that the accumulated ash remains on the filter, however, the carbon present within the ash reacts with $SO_2$ in the gas passing through the filter. The reaction consumes substantially all of the carbon, producing a mixture of gaseous sulfur, CO, $H_2S$, COS and $CS_2$. The reacted gases leave the high temperature filter via line 64. The effective reaction time in filter 62 is defined as the time necessary for the reaction with $SO_2$ to remove all or at least most of the carbon in the accumulated ash. The exact temperature at which the filter operates may vary slightly, depending on the inlet gas temperature in line 60 and the amount of time necessary to fully react the carbon with $SO_2$.

The gases 64 coming out of high temperature filter 62 pass through a catalyst bed 66 where the $SO_2$ reacts with the CO, $H_2S$, COS and $CS_2$, oxidizing them to $CO_2$, water vapor and elemental sulfur. Catalysts capable of effectively reacting the $SO_2$ in this manner are well known in the art. Excess heat can be recovered from the gas using conventional heat exchange means 68. The sulfur is condensed out from the gas as raw sulfur using condenser 70. A portion of the recovered sulfur 72 is then recycled to the first fluid bed reactor via inlet 14, while a second portion 74 goes to disposal. The amount of sulfur recycled to the first reactor should be slightly greater than the required stoichiometric amount, i.e., enough to have only a small residual amount of $SO_2$ remaining in the gases coming out of catalyst bed 66. Finally, steam is condensed out of the remaining gas using water condenser 76 and $CO_2$ waste 78 is sent to disposal.

The following example illustrates an equilibrium calculation the use of $SO_2$ to remove carbon from fly ash in accordance with the invention.

Example 1

A first fluid bed reactor operating at 10 atmospheres pressure and at a temperature in the range of 700° C. to 900° C. is used to oxidize a mixture of coal and recycled sulfur with $Fe_2O_3$. The $Fe_2O_3$ is reduced in the first fluid bed reactor after being reoxidized in a second fluid bed reactor. The gases exiting from the fluid bed reactor consist of $CO_2$, $H_2O$ and $SO_2$ and include fly ash particles containing carbon. The amount of recycled sulfur feed to the fluid bed is controlled such that the gases contain one mole of $SO_2$ for each mole of carbon in the fly ash.

In this example, the concentration of $SO_2$ in the gases is about 10%. The gases pass through a filter at a temperature in the 700° C. to 900° C. range. The fly ash particles remain on the filter with gas passing through the filter until the ash can be disposed of. In the absence of catalysts, the $CO_2$ and $H_2O$ have little tendency to react with the carbon. With catalysts, however, the $SO_2$ reacts readily, converting the carbon to gaseous products. Since one mole of $SO_2$ can remove more than one mole of carbon, some of the $SO_2$ containing gas passes through the fly ash from which the carbon has already been removed. A portion of the gas also passes through fly ash that still contains carbon. The former gases emerge from the filter still containing 10% $SO_2$. The reaction to equilibrium at 700° C. for the latter gives them a composition of 5.94% CO, 5.26% COS, 3.64% additional $CO_2$, 1.77% $CS_2$, and 0.22% sulfur vapor, at 800° C., a composition of 10.71% CO, 3.98% COS, 1.67% additional $CO_2$, 2.21% $CS_2$, and 0.31% sulfur vapor, at 900° C. a composition of 14.00% CO, 2.59% COS, 0.57% additional $CO_2$, 2.72% $CS_2$, and 0.042% sulfur vapor. At 700° C., 800° C., and 900° C., the carbon consumptions per mole of $SO_2$ are 1.78, 20.06, and 2,30, respectively.

Mixing of the unreacted gases that passed through the filter with the reacted gases yields a stoichiometric mixture which reacts to produce $CO_2$ and elemental sulfur. The heat of combustion of the recovered sulfur is 75.4% of the heat of combustion of the flue ash carbon consumed to produce it. Thus, for a low sulfur coal requiring 80% sulfur recycle to maintain the required sulfur balance, 60.3% of the heat of combustion of the fly ash carbon would be recovered and returned to the first fluid bed reactor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for burning coal containing sulfur using an unmixed combustion catalyst capable of being reduced when in an oxidized state and being oxidized when in a reduced state, comprising the steps of:

circulating said unmixed combustion catalyst between two fluid bed reactors whereby the catalyst becomes reduced by coal in the first fluid bed reactor and oxidized by air in the second fluid bed reactor and produces carbon-containing fly ash and gases containing $SO_2$ in said first fluid bed reactor;

separating out the carbon-containing fly ash produced by said first fluid bed reactor;

contacting said separated carbon-containing fly ash with said gases containing $SO_2$ from said first fluid bed reactor to produce $CO_2$, CO, $H_2S$, COS, $CS_2$, and elemental sulfur;

separating said elemental sulfur from the other gases; and recycling a portion of said elemental sulfur to said first fluid bed reactor.

2. The process according to claim 1, wherein said carbon-containing fly ash contains hydrogen and wherein the amount of $SO_2$ leaving said first fluid bed reactor is adjusted to provide about one mole of $SO_2$ for every mole of carbon in said fly ash and one mole of $SO_2$ for every four moles of hydrogen.

3. The process according to claim 1, wherein the portion of sulfur being recycled to said first fluid bed rector is in an amount slightly greater than the stoichiometric amount necessary to oxidize the carbon in said carbon-containing fly ash.

4. The process according to claim 1, wherein said unmixed combustion catalyst comprises iron oxides.

5. The process according to claim 1, wherein the balance of elemental sulfur is recovered for sale or disposal.

6. The process according to claim 1, wherein said step of separating said elemental sulfur further includes the steps of contacting said gaseous $CO_2$, CO, $H_2S$, COS, $CS_2$, and elemental sulfur with a catalyst and condensing out said elemental sulfur.

7. The process according to claim 1, wherein the step of circulating said unmixed combustion catalyst further comprises the step of circulating FeO and $Fe_2O_3$ between said fluidized beds in order to transfer oxygen present in the system.

8. The process according to claim 1, wherein a product gas from the second fluidized bed consists of vitiated air which is then expanded across a gas turbine to produce electricity.

9. An apparatus for oxidizing coal using an unmixed combustion catalyst that is capable of being readily reduced when in an oxidized state and readily oxidized when in a reduced state, comprising first and second fluid bed reactors;

means for circulating a mixture of said coal and said oxygen transfer catalyst material between said first and second fluid bed reactors;

a filter for separating carbon-containing fly ash from said first fluid bed reactor;

means for contacting said separated carbon-containing fly ash with said gases containing $CO_2$, CO, $H_2S$, COS, $CS_2$, and elemental sulfur; and means for separating and recycling a portion of said elemental sulfur to said first fluid bed.

10. An apparatus according to claim 9, further comprising means for removing a product gas from said second fluidized bed and expanding the product gas from the second fluidized bed across a gas turbine to produce electricity.

11. An apparatus according to claim 9, wherein said means for circulating said mixture of coal and oxygen transfer catalyst comprises crossover conduits between said first and second fluid bed reactors.

12. The apparatus according to claim 9, wherein connections between said fluidized bed reactors are isolated by flowing steam to prevent the crossover of gases.

13. The apparatus according to claim 9, wherein said second fluidized bed comprises a bubbling fluidized bed or a riser reactor.

14. An apparatus according to claim 9, wherein said means for separating elemental sulfur includes a catalyst bed for contacting with said gases containing $CO_2$, CO, $H_2S$, COS, $CS_2$ and said elemental sulfur.

\* \* \* \* \*